No. 638,201. Patented Nov. 28, 1899.
S. H. PETRO.
COMBINED HAY AND STOCK RACK.
(Application filed Aug. 24, 1899.)
(No Model.) 2 Sheets—Sheet 1.
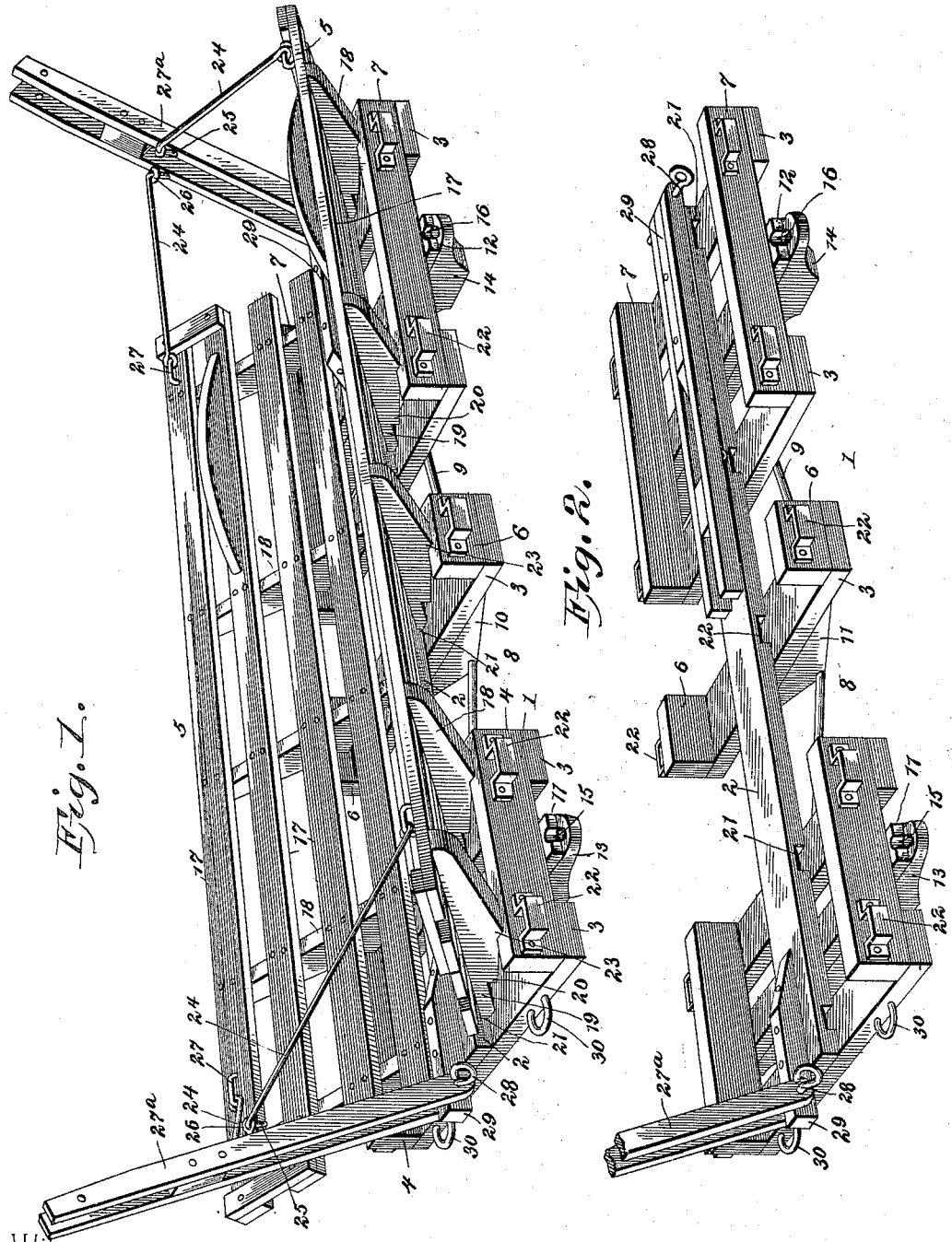

No. 638,201. Patented Nov. 28, 1899.
S. H. PETRO.
COMBINED HAY AND STOCK RACK.
(Application filed Aug. 24, 1899.)
(No Model.) 2 Sheets—Sheet 2.
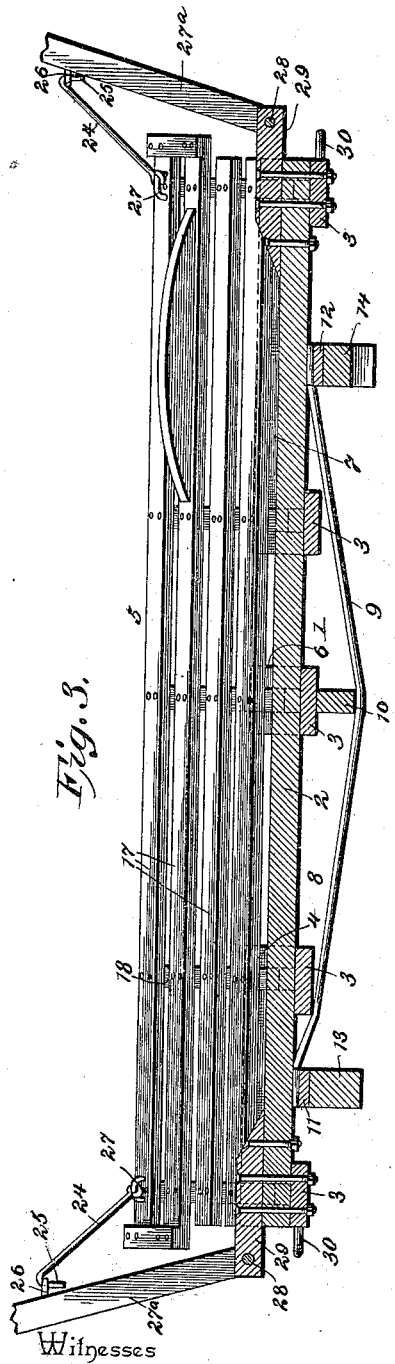
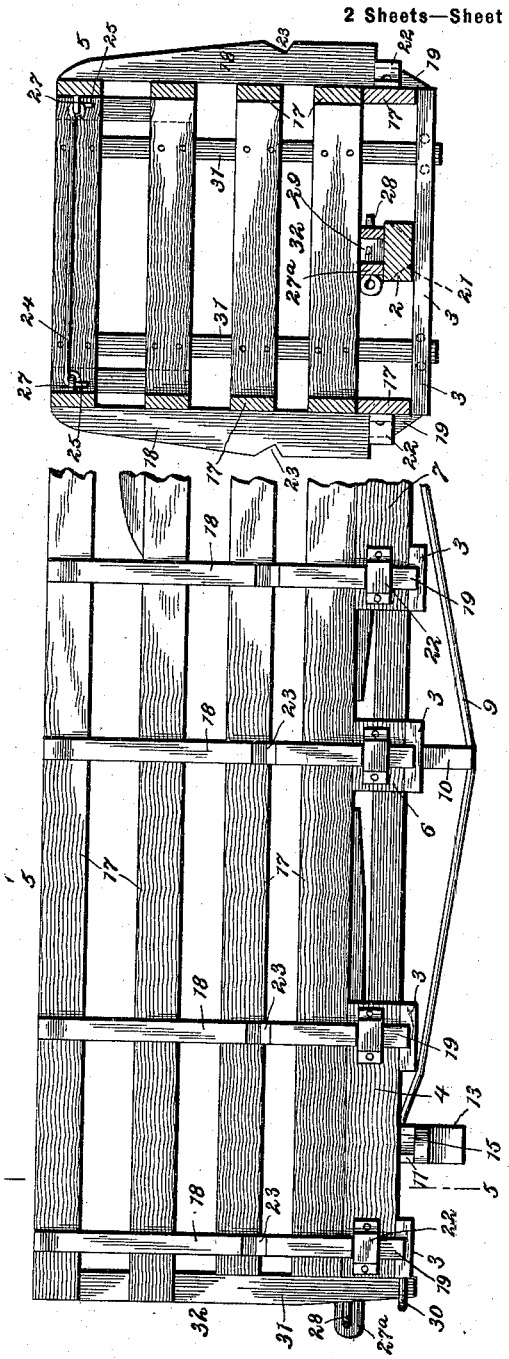
Witnesses
Howard D. Orr.
J. F. Riley
Samuel H. Petro, Inventor
By his Attorneys,
C. A. Snow & Co.

UNITED STATES PATENT OFFICE.

SAMUEL H. PETRO, OF DARLINGTON, INDIANA, ASSIGNOR OF ONE-HALF TO CHARLES W. PETRO, OF SAME PLACE.

COMBINED HAY AND STOCK RACK.

SPECIFICATION forming part of Letters Patent No. 638,201, dated November 28, 1899.

Application filed August 24, 1899. Serial No. 728,334. (No model.)

*To all whom it may concern:*

Be it known that I, SAMUEL H. PETRO, a citizen of the United States, residing at Darlington, in the county of Montgomery and State of Indiana, have invented a new and useful Combined Hay and Stock Rack, of which the following is a specification.

The invention relates to improvements in combined hay and stock racks.

The object of the present invention is to improve the construction of hay and stock racks and to provide a simple and comparatively inexpensive construction adapted to be readily converted into either a hay or stock rack and capable of being arranged on an ordinary running-gear.

The invention consists in the construction and novel combination and arrangement of parts hereinafter fully described, illustrated in the accompanying drawings, and pointed out in the claims hereto appended.

In the drawings, Figure 1 is a perspective view of a combined hay and stock rack constructed in accordance with this invention and shown arranged as a hay-rack. Fig. 2 is a detail view of the bed-frame, the sides of the rack being removed. Fig. 3 is a longitudinal sectional view, the parts being arranged as shown in Fig. 1. Fig. 4 is a side elevation of a portion of the device, the parts being arranged to form a stock-rack. Fig. 5 is a transverse sectional view on line 5 5 of Fig. 4.

Like numerals of reference designate corresponding parts in all the figures of the drawings.

1 designates a bed-frame designed to be mounted on a running-gear and composed of a central longitudinal bar 2 and transverse bars 3, arranged at the front and back of the bed-frame and at an intermediate point. The front transverse bars 3 are connected at their ends by short side bars or sills 4, secured to the upper faces of the front transverse bars and forming supports for the rack sides 5 when the same are arranged, as shown in Fig. 1, to form a hay-rack, and, as shown in Fig. 5, to form a stock-rack. The central transverse bar 3 is provided at its ends with blocks 6, arranged in alinement with the sills 4, and the rear transverse bars 3 are connected by side bars or sills 7, which are slightly longer than the front side bars or sills 4. The front side bars or sills 4 are shortened to provide a space 8 between them and the central transverse bar sufficient for the front wheels in turning a vehicle. The bed-frame is supported by a central longitudinal truss-rod 9, having its ends suitably secured to the front and rear portions of the bed-frame and arranged beneath the same, as clearly shown in Fig. 3. The central portion of the truss-rod is bowed downward and is separated from the bed-frame by an oppositely-tapered strut-block 10, which is substantially triangular. The strut-block, which is secured to the lower face of the central transverse bar, is provided at its apex with a groove for the reception of the truss-rod. The bed-frame is provided at points between the front and rear transverse bars with cross-bars 11 and 12, adapted to rest upon the front and rear bolsters 13 and 14, as illustrated in Figs. 1 and 2 of the drawings, and provided at their ends with notches 15 and 16, adapted to engage the standards of a running-gear, whereby the bed-frame is securely held thereon.

The rack sides, which are adapted to be arranged at an inclination, as shown in Fig. 1, to form a hay-rack, and vertically, as shown in Fig. 5, to form a stock-rack, are composed of longitudinal bars 17 and transverse bars 18, which connect the longitudinal bars and which are provided at their inner ends with tapering tongues 19. The connecting-bars 18 are reduced to form the tongues 19 and to provide shoulders 20. The tongues are beveled at their lower or outer faces for about half their length, and they are adapted to fit into recesses or sockets 21 of the longitudinal bars and keepers or loops 22 of the side sills and the blocks 6. When the rack sides are arranged at an inclination, as shown in Fig. 1, the beveled faces of the tongues are disposed horizontally and rest upon the upper faces of the transverse bars 3 and the tongues project into the recesses or sockets 21, which are tapering to conform to the configuration of the said tongues. The inner portions of the tongues are rectangular and fit tightly in the loops or keepers 22, and the shoulders 20 fit upon or rest against the upper edges of the loops or keepers when the parts are arranged to form a stock-rack. The transverse connecting-bars are provided between their ends with notches 23, arranged to receive the inner upper edges of the front and rear sills and the blocks 6 when the rack sides are arranged at an inclination. These notches or recesses 23 enable the transverse connecting-bars to fit against the upper and inner faces of the side sills and the blocks 6 and lock the rack sides against outward movement. The longitudinal bar 2 of the bed-frame is recessed at its lower face to provide the sockets for the tongues of the rack sides, and the transverse bars 3 form the bottom walls of the recesses or sockets 21.

The rack sides are provided with rods 24, having hooks 25, adapted to engage eyes 26 of standards 27$^a$ when the parts are arranged to form a hay-rack. The rods are hinged to the rack sides by means of enlarged loops or staples 27 and are adapted when the parts are arranged to form a stock-rack to extend across the same and engage such loops 27, as illustrated in Fig. 5 of the accompanying drawings. The rods at their points of connection to the sides of the rack are provided with eyes for the reception of the enlarged loops 27. The standards are composed of bars spaced apart and detachably hinged at their lower ends by pins 28 to blocks 29, disposed longitudinally of and secured to the ends of the bar 2 of the bed-frame. The standards, which may be moved, are adapted to fold inward upon the upper face of the longitudinal bar 2, as illustrated in Fig. 2 of the drawings.

The bed-frame is provided at each end with eyes or loops 30, which are adapted to receive the lower terminals of vertical bars 31 of the ends 32 of the rack, and the spaces between the longitudinal bar 2 and the sides of the rack are designed to be closed by boards (not shown) to form a complete floor or bottom when the parts are arranged to form a stock-rack.

It will be seen that the combined hay and stock rack is simple and comparatively inexpensive in construction, that it is adapted to be readily arranged on the running-gear of an ordinary farm-wagon, and that it may be readily converted into a hay or stock rack.

Changes in the form, proportion, size, and the minor details of construction within the scope of the appended claims may be resorted to without departing from the spirit or sacrificing any of the advantages of this invention.

What is claimed is—

1. A combined hay and stock rack comprising a bed-frame composed of a central longitudinal bar having sockets at its side edges, transverse bars 3 forming the bottom walls of the sockets and arranged at the front and at the center of the bed-frame, the front and rear side sills secured to the front and rear transverse bars, and provided with loops or keepers, and the blocks 6 secured to the central transverse bar and having loops or keepers, said bed-frame being adapted to receive either hay-rack standards or stock-rack ends, and the rack sides provided with transverse connecting-pieces having beveled tongues at their lower or inner ends, adapted to engage the said sockets and the said loops or keepers, said connecting-pieces being provided between their ends with notches or recesses to receive the inner upper edges of the sills and the blocks, substantially as described.

2. A combined hay and stock rack comprising a central longitudinal bar, transverse bars arranged at the front, rear and center of the bed-frame, side sills mounted on the front and rear transverse bars, blocks secured to the central transverse bar, the cross-bars adapted to be arranged on the bolsters of a running-gear and secured to the lower edges of the said sills, a strut-block arranged beneath the central transverse bar, and the longitudinal truss-rod engaging the strut-block and having its ends secured to the front and rear portions of the bed-frame, and the rack sides adapted to be arranged in either a vertical or an inclined position, substantially as described.

3. In a combined hay and stock rack, the combination of a bed-frame, rack sides adapted to be arranged either in a vertical or an inclined position, the rods provided at their outer ends with eyes and having hooks at their inner ends adapted to engage standards, and the enlarged loops arranged at the inner faces of the rack sides and extending longitudinally thereof and linked into the said eyes said loops performing the double function of hinging the rods to the rack sides and forming keepers to be engaged by the hooks to retain the rack sides in a vertical position, and extending entirely across and connecting said sides when the latter are in such position, substantially as described.

In testimony that I claim the foregoing as my own I have hereto affixed my signature in the presence of two witnesses.

SAMUEL H. PETRO.

Witnesses:
S. S. MARTIN,
TOM LYNCH.